SWITCHING CIRCUIT

Filed Dec. 11, 1957 3 Sheets-Sheet 1

INVENTORS D. B. JAMES
J. D. JOHANNESEN
BY R. C. Winter
ATTORNEY

INVENTORS D. B. JAMES
J. D. JOHANNESEN
BY
R. C. Winter
ATTORNEY

May 10, 1960 D. B. JAMES ET AL 2,936,338

SWITCHING CIRCUIT

Filed Dec. 11, 1957 3 Sheets-Sheet 3

INVENTORS D. B. JAMES
J. D. JOHANNESEN

BY R. C. Winter

ATTORNEY

United States Patent Office 2,936,338

Patented May 10, 1960

2,936,338

SWITCHING CIRCUIT

Dennis B. James, Murray Hill, and John D. Johannesen, Morris Plains, N.J., assignors to Bell Telephone Laboratories, Incorporated, New York, N.Y., a corporation of New York

Application December 11, 1957, Serial No. 702,149

18 Claims. (Cl. 179—15)

This invention relates to electrical transmission circuits, and more particularly to transmission circuits including gating networks applicable to information handling systems.

In present day high speed information handling systems, a practice that may be employed in transferring information from one locality to another is time sharing or time division multiplexing, which permits the simultaneous exchange of information between each one of a plurality of communication terminals and a corresponding one of a remote plurality of terminals over a common communication link. This practice requires that, in successive short time intervals, each pair of terminals in communication be assigned a frequently recurring discrete time slot during which information may be sampled and received. In the interval between appearances of the time slot assigned to a particular pair of terminals, the common communication link is available to other communication terminals. By sampling at a sufficiently rapid rate, proper filtering in transmission and rapid transfer of the sampled information to and from the common communication link, an accurate reproduction of the information transmitted from one terminal of the pair may be formed at the other terminal of the pair.

Such a system may be utilized, for example, in various systems where a plurality of communication devices may be connected via a common communication link to another plurality of communication devices in order to conserve expensive transmission facilities. A system of this type is described in a patent application of E. T. Burton, A. L. Robinson and E. L. Younker, Serial No. 364,258, filed June 26, 1953.

A four-wire transmission system advantageously is utilized as the common communication link in a number of applications. Such a system of course introduces the requirement of proper termination of the four-wire common link in each two-wire terminating line circuit. It is necessary to incorporate in such systems a gating network which permits the complete transfer of information during the time slot period assigned to a terminal and complete obstruction to transfer of information at other times. Utilizing a hybrid connection, as known in the art, each terminating line circuit then would comprise a distinct filter and gate for transmission and a distinct filter and gate for reception in addition to the hybrid coils for connection of both transmission and reception paths to the two-wire terminal. Since the time division system has for a principal objective the conservation of space and the maximum utilization of each component, this terminating line equipment advantageously should be reduced to a minimum.

It is a general object of this invention to provide an improved signal transmission system.

More specifically, it is an object of this invention to provide an improved time division transmission system capable of transmitting information between a plurality of remote terminals over a common communication link.

It is a further object of this invention to provide a four-wire transmission system with a simplified coupling to the two-wire terminals.

It is another object of this invention to reduce and simplify the terminating line equipment.

These and other objects of this invention are attained in one specific illustrative embodiment wherein a transmission network of the type described in the aforementioned application of Messrs. Burton, Robinson and Younker comprises, in accordance with this invention, a plurality of gates in the four-wire common communication link and a single filter and gate for each two-wire terminal in addition to a conventional repeat coil for connection to the terminal. Low pass filter networks terminated in a shunt capacitance are employed in the terminal equipment, and a small inductance is inserted in the transmission path to permit virtually lossless transfer of information stored in the shunt capacitance through the gates to a storage capacitance in the common communication link. This combination of filter, inductance and gates is referred to as the resonant transfer circuit and is described in detail in W. D. Lewis patent application Serial No. 633,358, filed January 9, 1957.

The timing of gate operation in the system is arranged such that during operation of a local line gate information stored in its filter capacitance is transferred through a "send" gate in the common communication link to a storage capacitance. The "send" gate is disabled upon completion of this transfer, and the stored information is transmitted to the remote end of the link connection to a line designated to receive the information. When the "send" gate is disabled, a "receive" gate in the common link operates to transfer information being transmitted from the remote line through the local line gate. The line gate remains operated during the entire time slot interval so that information is both transmitted and received therethrough during this interval. A "clamping" gate is operated thereafter to discharge any of the signal remaining in the storage capacitance of the common link. The link is now in condition to receive information from and transmit information to the terminals assigned to the succeeding time slot.

A gating circuit which satisfies the requirements in this system of alternate zero and infinite impedance to current flow in either direction is shown in J. D. Johannesen, P. B. Myers and J. E. Schwenker patent application Serial No. 570,530, filed March 9, 1956, now Patent No. 2,899,570, issued August 11, 1959. The circuit comprises a pair of transistors having common bases and common emitters and a magnetic core coupled to the base and emitter of each transistor. Such a gating circuit may be associated with a terminal such as a telephone station by connection of the station line to the collector of one transistor through a low pass filter and the connection of the collector of the other transistor to the common link. The gate is activated to allow passage of signals therethrough for an interval defining a time slot. Activation to open and close the gate results from the application of timed pulses to the magnetic core. The send, receive and clamping gates in the common link, as well as the line gates, advantageously may be of this two transistor type.

Should the calling party desire to contact a party in his own group of stations, the system in accordance with this invention permits completion of such a connection through an intraoffice trunk which comprises merely the line gate and a capacitance to ground. The information transferred over the common communication link from the calling party passes through the line gate in the intraoffice trunk and is stored in the capacitance. Thereafter, upon operation of the intraoffice trunk line gate in its next preassigned time slot, the stored information is transferred over the common communication link to the terminal of the called party.

The unique combination of gating circuits and storage capacitance in the common link permits the elimination from the individual line circuits of the voice frequency hybrid for four-wire to two-wire connection. The components required in each line circuit are further reduced by one filter circuit and one gating circuit. As the hybriding function is now performed in the common communication link itself the unique gating arrangement therein is referred to as the "time division hybrid."

It is a feature of this invention that a line circuit in a four-wire time division communication system comprise a single filter and gating circuit connected to a conventional repeat coil.

It is another feature of this invention that the common communication link in a four-wire time division communication system comprise at each side of the link a time division hybrid consisting of transmission, reception and clamping gates, and a storage capacitance.

It is a further feature of this invention that a line circuit utilized for intraoffice trunking comprise a single gating circuit and a storage capacitance.

A complete understanding of these and other features of this invention may be gained from consideration of the following detailed description, together with the accompanying drawing, in which.

Figure 1:
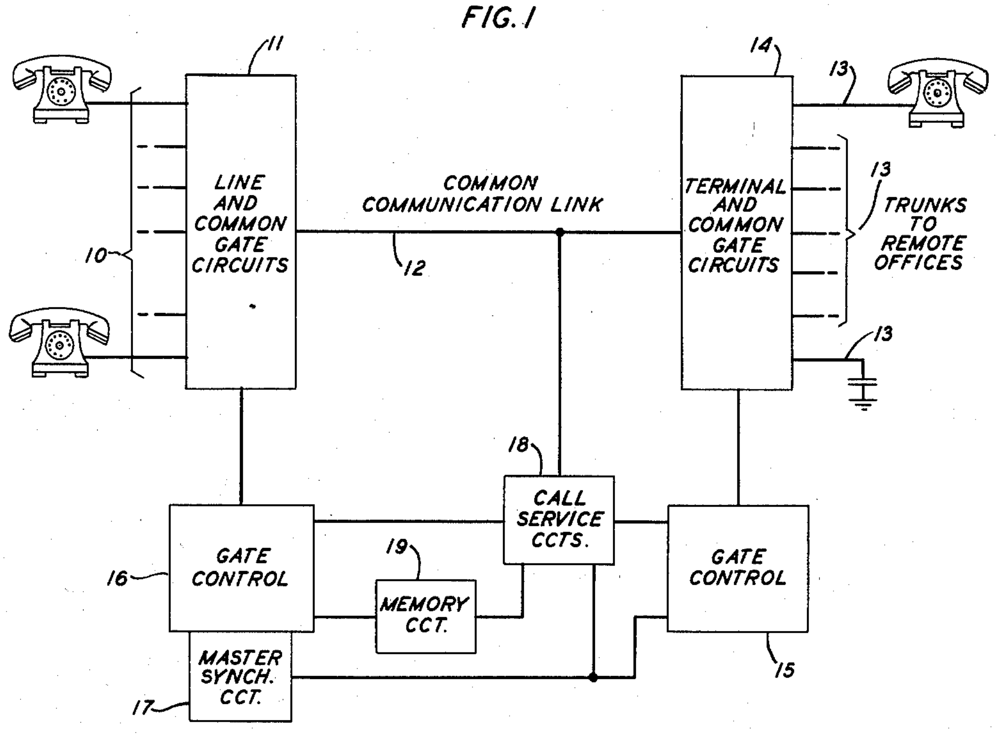
Fig. 1 is a schematic representation in block form of a telephone system in which a time division hybrid arrangement in accordance with this invention may be employed.

Turning now to the drawing, the basic elements of a time division telephone exchange illustrative of one embodiment of this invention are depicted in Fig. 1. As shown therein, a plurality of subscriber lines 10 are each connected through line and common gate circuits 11 to a common communication link 12. Similarly, a plurality of other subscriber lines, interoffice trunks or intraoffice trunks 13 are connected to the common communication link 12 by terminal and common gate circuits 14. The interoffice trunks in this instance serve to increase the traffic capacity of this system by providing access to various groups of subscribers in remote exchange areas.

In accordance with the Burton-Robinson-Younker patent application cited hereinbefore, each of the gates in terminal and common gate circuits 14 is enabled in properly timed intervals by a gate control circuit 15, including a sequence circuit for operation of the various terminal gates in a regular sequence, which circuit may be a binary counter circuit of the type disclosed in application Serial No.263,598, filed December 27, 1951, by E. T. Burton, now Patent No. 2,828,071, issued March 25, 1958. The binary counter circuit recycles continuously after a specific number of steps, depending on the number of lines or trunks 13 which may be connected to the common communication link or talking bus 12. Each individual step defines the time slot of a particular line or trunk with the exception that the intraoffice trunk is defined by two distinct time slots, and the total number of steps together define the office cycle of the time division exchange. The gate control circuit 15 also serves to operate send and receive gates in the common communication link during portions of each time slot, and the clamping gate for a time interval between time slots.

The gates in line and common gate circuits 11 are operated under control of information from a regenerative memory system included in the gate control circuit 16. Each of the line gates is identified by a code and a particular one of the lines 10 is active while its code is in the memory system. During this time the associated line gate is enabled once per office cycle in the time slot assigned to the trunk to which the line is connected through the exchange. As used herein, the term "time slot" is defined as the time during which a pair of gates; viz., one line gate and one terminal gate, is enabled, as described above, and thus during which one conversation may be sampled over the common link 12. The term may be used to denote either the length of the interval of time or the relative position of such an interval in an office code. Thus connection between two subscriber lines directly, through an interoffice trunk, or through an intraoffice trunk, is effected by properly timed operation of the associated gates in circuits 11 and 14.

A master synchronizing circuit 17 which generates a synchronizing signal to mark the start of each time slot serves to pace all timed circuit functions. A call service selector circuit 18 receives pulse information from the common link 12, from the circulating memory 19, from the trunk gate control circuit 15 and from the master synchronizing circuit 17. This selector circuit 18 recognizes and processes requests for service. Memory circuit 19 circulates the identifying line codes, scans all the time slots and erases from the circulating memory the code appearing in any time slot in which there is not detected a pulse indicating that the particular time slot is being used. Each of the lines 10 and the lines or trunks 13 is connected to the four-wire common link 12 by the gates in circuits 11 and 14, respectively.

Figure 2:
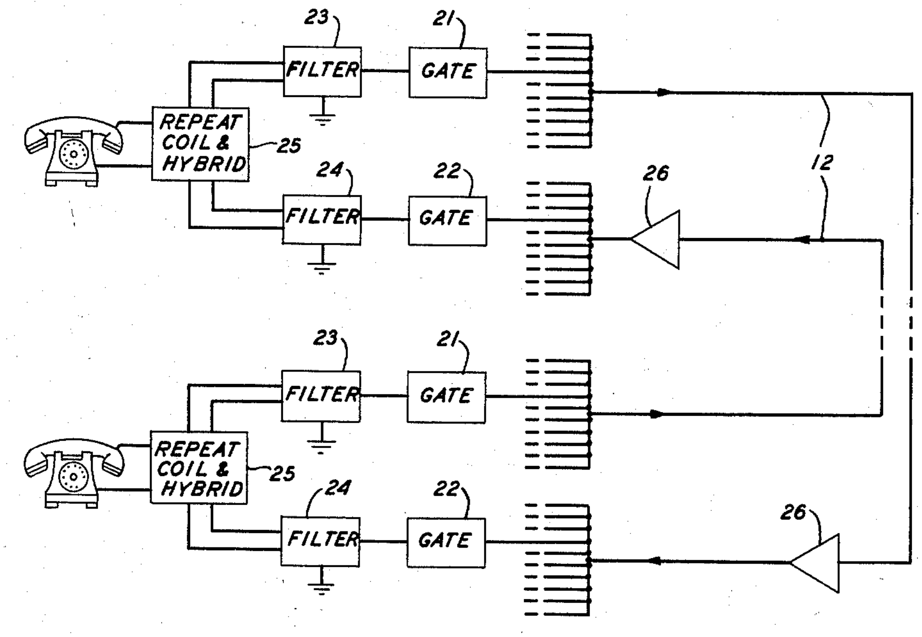
Fig. 2 is a schematic representation in block diagram form illustrating a conventional hybrid arrangement in a four-wire transmission system.

As shown in Fig. 2, one known arrangement for a time division system may comprise a send gate 21 and a receive gate 22 associated with the line at each end of the common communication link 12. In addition to these gates 21 and 22 associated with each line, a low pass filter 23 and a low pass filter 24 are required to attenuate signals outside the voice frequency range in both the transmission and reception paths. In addition, a repeat coil and hybrid arrangement 25, comprising a complex of inductive windings and line balancing elements, is required to terminate the four-wire transmission medium in the two-wire telephone circuit. A time division system gains one advantage from the connection of a plurality of lines to a common communication link rather than requiring a pair of transmission lines to serve each pair of interconnected stations. Thus a valuable saving in transmission line is realized. The time division system as shown in Fig. 2, however, does not change the component requirements for the individual line circuits.

Figure 3:
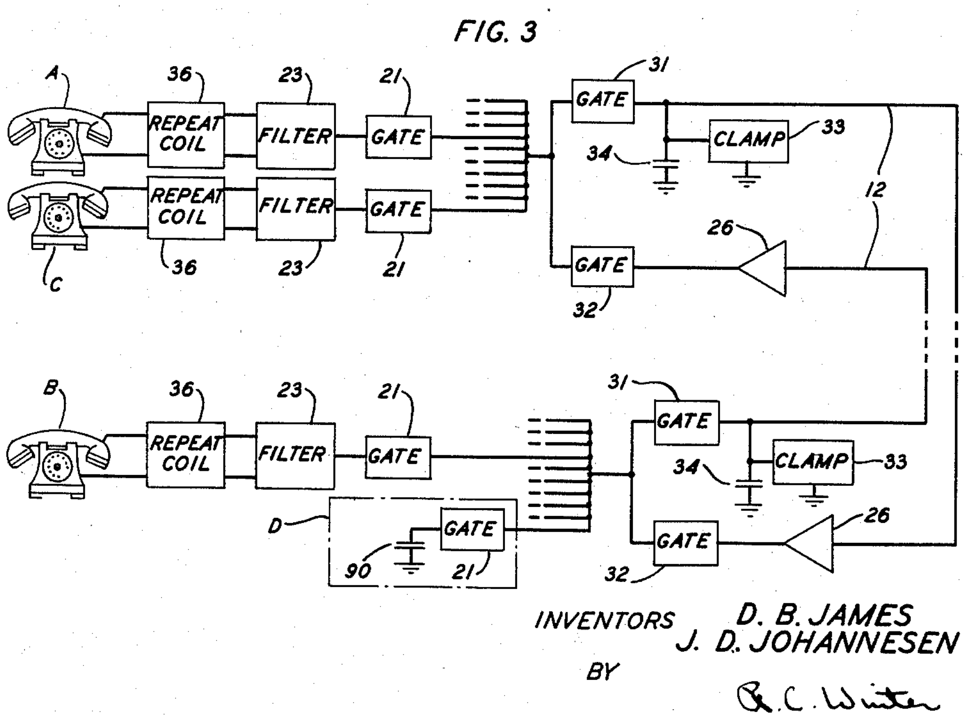
Fig. 3 is a schematic representation of one illustrative embodiment of a time division hybrid arrangement in accordance with this invention that may be employed in the telephone system of Fig. 1.

As shown in Fig. 3, in accordance with this invention, a time division hybriding arrangement in the common communication link presents a second advantage to the use of time sharing in a communication system by enabling a sizable reduction in the components required for each individual line circuit. Thus, in addition to the amplifiers 26 in each transmission channel of the four-wire common communication link 12, the link incorporates a send gate 31, a receive gate 32, a clamping gate 33 and a storage capacitance 34 in each channel. This addition of equipment in the common communication link permits a reduction of almost one-half in the components required for each individual line circuit. Thus, a line circuit in a time division four-wire system utilizing the time division hybrid of Fig. 3, comprises a single low pass filter 23, a single gate circuit 21, and a conventional repeat coil 36 to take the line from balanced to unbalanced operation and to isolate the talking battery from the gating circuits and common equipment, as is known in the art.

Figure 4:
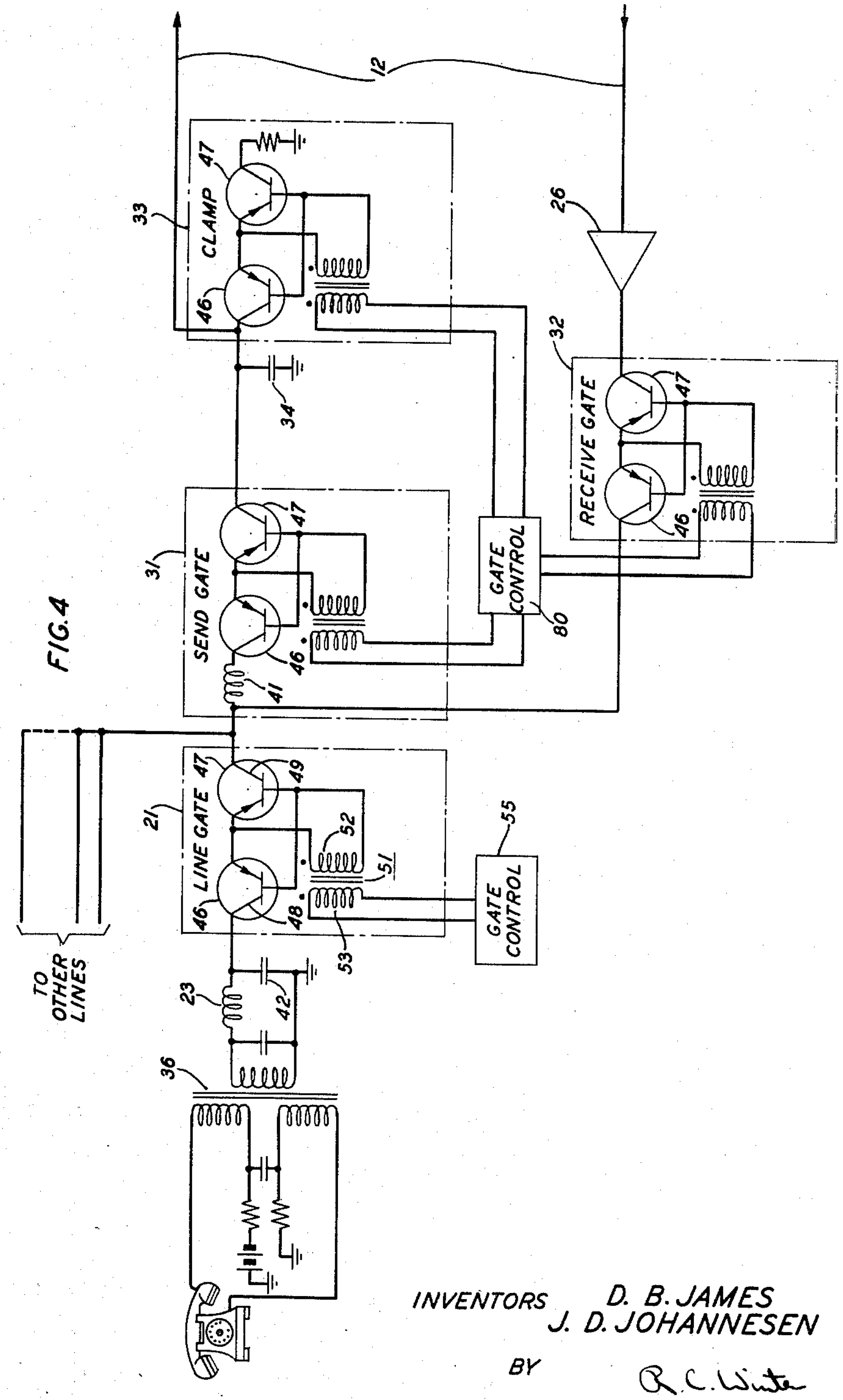
Fig. 4 is a detailed schematic representation of a portion of the arrangement of Fig. 3.

As shown in more detail in Fig. 4, the low pass filter 23 may comprise well known low pass filter elements, primarily sections of series inductance and shunt capacitance to produce the required cutoff characteristics. A resonant transfer inductance 41 permits lossless transfer of information stored in the shunt capacitance 42 of the low pass filter 23, through the line gate 21 and send gate 31 to the storage capacitance 34 in the common communication link.

Each of the line gates 21, as well as the send, receive and clamping gates in the common equipment, advantageously may comprise a pair of transistors 46 and 47 connected back-to-back in series in the signal path or, in the case of the clamping gate, between the signal path and ground. These gates, as mentioned hereinbefore, may be of the type disclosed in the patent application of Johannesen, Myers and Schwenker. The signal terminals of the various gating circuits are the two collector regions. Line gate 21 has its collector 48 connected to an individual subscriber line or trunk, as appropriate, and its other collector 49 connected to the common communication link. Accordingly, regardless of the polarity of the voltage impressed on the gating circuit, one of the transistors has its collector reverse biased, thereby presenting a high series impedance in the signal path. Control of the gating circuit is effected by driving a current from the common base connection to the common emitter connection. This is accomplished by means of a square loop magnetic core, represented by transformer 51, having an output winding 52 electrically connected between the common base lead and the common emitter lead and a drive winding 53 connected to the gate control circuitry 55. A current pulse switches core 51 and opens the gate 21 during the core switching period. Upon cessation of switching or termination of the input pulse, the gate 21 again closes, thus defining a time slot.

In accordance with this invention, each line gate 21 during its allotted time slot transfers information stored in its associated line circuit through the send gate 31 in the common communication path, which information is then stored in capacitance 34 of the common talking bus. The time required for the transfer of information from the line circuit to the common talking bus occupies a fraction of the alloted time slot. During the balance of the time slot, while the line gate remains operated, the send gate 31 is disabled, and the receive gate 32 is operated to transfer information from the remote terminal through the line gate 21 for storage in the capacitance 42 and subsequent transfer to the receiver of the calling party's subset. During the time the receive gate 32 is operated, the information priorly stored in capacitance 34 from the calling line is transferred over the common communication path and through the receive gate 32 and line gate 21 of the called party. At the end of the time slot period the line gates and receive gates of the respective parties are opened. Shortly after termination of the time slot interval the clamping gate 33 is operated so as to discharge any signal remaining on the capacitance 34, thereby preparing the common transmission medium to receive information from another substation in a succeeding time slot. Amplifiers on each side of the common talking bus assure the transfer of information stored in the common talking bus to the receive gates at the respective ends of the line at a desired transmission level.

Figure 5:
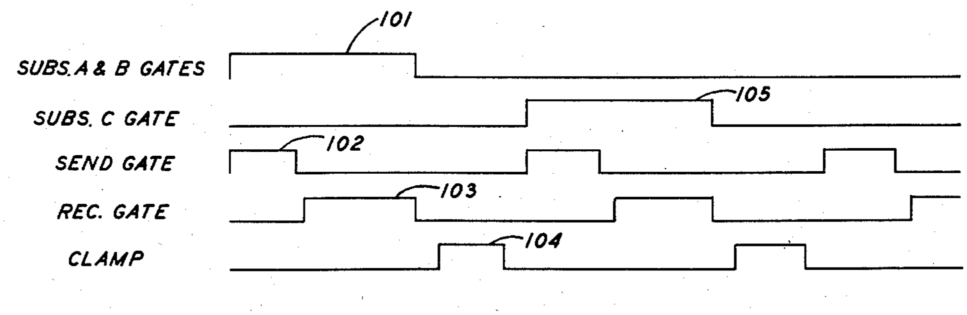
Fig. 5 is a chart illustrating the timing of the various gating circuit operations of the circuit of Fig. 3.

The gate control circuitry 80 connected to the various gates of the time shared hybrid on each side of the common transmission link provides timed pulses for gate operation in accordance with the chart in Fig. 5. Thus a pulse 101 enables the line gates 21 of communicating subscriber lines A and B, Fig. 3, during the interval in each office cycle that information stored in these lines is to be sampled. Simultaneously with the application of the time slot pulse 101 to the line gates, a pulse of duration 102 is applied by gate control 80 to enable "send" gates 31. At the end of pulse interval 102 transfer of information from the lines of subscribers A and B to the common link is terminated by disabling gate 31. A pulse of duration 103 is applied to "receive" gates 32 at this time, which pulse holds gates 32 operated to the end of the time slot, at which time the receive and line gates are disabled. During this interval, information from the common link is transferred into the line circuits of subscribers A and B. After a time slot interval, with all transmission gates disabled, pulse 104 operates clamping gates 33 so as to discharge to ground any signal remaining on capacitance 34. The system is now prepared for the next time slot interval initiated by pulse 105 operating the line gates of another pair of subscribers' lines, which may include subscriber C.

In one specific application according to this invention, the timing of the control pulses is established such that a plurality of individual subscriber lines are served by the system on a time division basis. Each busy line is sampled 8,000 times each second, the interval of each sample, or time slot, being approximately 2 microseconds. Thus the send and receive gates in the common communication link operate alternately for approximately one microsecond during each time slot interval.

Assuming now that subscriber A, Fig. 3, desires to talk to subscriber C, both being lines connected to the same end of the common communication link, the call is established by a properly timed gate operation via an intraoffice trunk D. Station A and intraoffice trunk D will have their respective line gates operated during the same time slot, so that information to be transferred from Station A to Station C will be stored in the capacitance 90 of the intraoffice trunk during the time slot assigned to Station A. Similarly, Station C and the intraoffice trunk D will have their respective line gates operated during a later time slot than that assigned to Station A. Thus information transmitted from Station A and stored in capacitance 90 of the intraoffice trunk will be transmitted over the common communication link to Station C during the time slot assigned to Station C, and information transmitted from Station C will be stored in the capacitance 90 during this time slot for later transmission over the common talking bus to Station A upon the occurrence of its time slot. Due to the unique arrangement of time division hybrids in the common communication link, the intraoffice trunk D need only comprise the two transistor line gate, as described hereinbefore, and a storage capacitance. Proper timing of the control pulse applied to the time division hybrid gates permits transfer of the information to and from the intraoffice trunk via the four-wire common communication link.

It may be appreciated that in a system having an appreciable number of telephones connected to a common communication link on a time division basis, a considerable saving in components is realized by utilizing the time division hybrid in accordance with this invention. For each station connected to the system, a saving of approximately one-half the line equipment cost over a conventional two- to four-wire hybrid arrangement is realized without loss of efficiency in the system operation. This reduction in equipment also provides an appreciable space saving and ease in packaging of line circuit equipment.

It is to be understood that the above-described arrangements are illustrative of the application of the principles of this invention. Numerous other arrangements may be devised by those skilled in the art without departing from the spirit and scope of this invention.

What is claimed is:

1. A time division communication system including more than two lines, a common communication link connected to said lines and comprising a pair of channels for transmission in opposite directions, each of said channels comprising a pair of gates and storage means, means for enabling a first of said pair of gates in each channel during a first interval to transfer information from selected ones of said lines to said storage means, and means for enabling the second of said pair of gates in each channel during a second time interval to transfer said information from said storage means to said selected lines.

2. A time division communication system comprising more than two input lines, a common communication link, a line gate individual to each of said lines and connecting said lines to said communication link, said communication link including a send and a receive channel and each of said channels including a send gate, a receive gate and a capacitor connected in shunt between said send and receive gates, means for enabling selected ones of said line gates during a period, and means for enabling said send gates and said receive gates in succession during said period to transfer information to and from said capacitors, respectively.

3. A time division communication system including more than two lines, a common communication link connected to said lines and comprising a pair of channels for transmission in opposite directions, each of said channels comprising a send gate, a receive gate and an intermediate signal storage means, and means for enabling in unison during a first interval the send gate in each said channel to transfer information from selected ones of said lines to said signal storage means and for enabling in unison during a second interval the receive gates in each said channel to transfer information to said selected lines.

4. A time division communication system in accordance with claim 3 and further comprising a single line gate in each of said lines, and means for enabling selected ones of said line gates simultaneously at the beginning of said first interval and for disabling said selected line gates simultaneously at the end of said second interval.

5. A time division communication system in accordance with claim 4 wherein said line gates comprise a balanced arrangement of solid state elements to permit alternate high and low impedance to signals transmitted therethrough in both directions.

6. A time division communication system in accordance with claim 4 and further comprising means in each said channel operative in the interval between disablement of said receive gates and enablement of said send gates to discharge to ground any signal remaining in said signal storage means.

7. A time division communication system in accordance with claim 4 and further comprising in each said line a single low pass filter and transformer connected between the line terminal and line gate.

8. A time division communication system in accordance with claim 4 and further comprising a resonant transfer inductance connected to the input of said send gate in each said channel.

9. In a four-wire time division communication system a plurality of two-wire lines each comprising a line transmission gate, a common communication link connected to said lines and comprising a pair of two-wire channels for transmission in opposite directions, each of said two-wire channels comprising a send gate, a receive gate and intermediate storage and amplifying means, means enabling said send gates and selected ones of said line gates in unison to transfer information to said two-wire channels, means disabling said send gates and enabling said receive gates to transfer information from said common communication link through said selected line gates, and means disabling said receive gates and said selected line gates in unison.

10. A time division communication system comprising a plurality of first lines, a plurality of second lines, a common communication link between said lines, line gates individual to each of said first and second lines for connecting said lines to said communication link, said communication link comprising a pair of channels in parallel and each of said channels including a send gate, a shunt storage element, and a receive gate, and means for enabling said line gates of a selected first and second line and said send gates in each channel simultaneously to transfer information from said selected first and second line to said storage elements during a first period and for enabling said receive gates during a second period while said line gates remain enabled to transfer said information from said storage elements to said selected second and first line.

11. A time division communication system including a plurality of lines, a common communication link connected at one end to said lines and comprising first and second channels for transmission in opposite directions, each of said channels comprising first gate means for transferring information from a selected one of said lines to said common communication link, second gate means for transferring information from said common communication link to said selected line, said lines comprising third gate means for transferring information to and from said common communication link, and control means to operate said first and second gate means sequentially and to operate said third gate means in said selected line during operation of said first and second gate means.

12. A time division communication system in accordance with claim 11 wherein said third gate means comprise a balanced arrangement of solid state elements to permit alternate high and low impedance to signals transmitted therethrough in both directions.

13. A time division communication system in accordance with claim 11 wherein said control means comprises means for enabling said third gate means in said selected line and said first gate means simultaneously and for disabling said third gate means in said selected line and said second gate means simultaneously.

14. A time division system in accordance with claim 13 wherein each of said channels comprises signal storage means.

15. A time division communication system in accordance with claim 14 and further comprising means in each said channel operative in the interval between disablement of said second gate means and enablement of said first gate means to discharge to ground any signal remaining in said signal storage means.

16. A time division communication system in accordance with claim 15 and further comprising in each said line a single low pass filter and pulse transformer connected between the line terminal and line gate.

17. A time division communication system in accordance with claim 15 and further comprising a resonant transfer inductance connected to the input of each of said first gates.

18. A time division communication system in accordance with claim 15 and further comprising a line connected at the other end of said common communication link, means for storing information transferred from said link to said line, and means operative thereafter to transfer said stored information from said line storage means to said link.

References Cited in the file of this patent

UNITED STATES PATENTS

| | | |
|---|---|---|
| 2,080,082 | Loth et al. | May 11, 1937 |
| 2,406,349 | Buhrendorf | Aug. 27, 1946 |
| 2,490,833 | Ransom | Dec. 13, 1949 |